(No Model.)
J. SPARROW.
VEHICLE WHEEL SCRAPER.
No. 388,378. Patented Aug. 21, 1888.
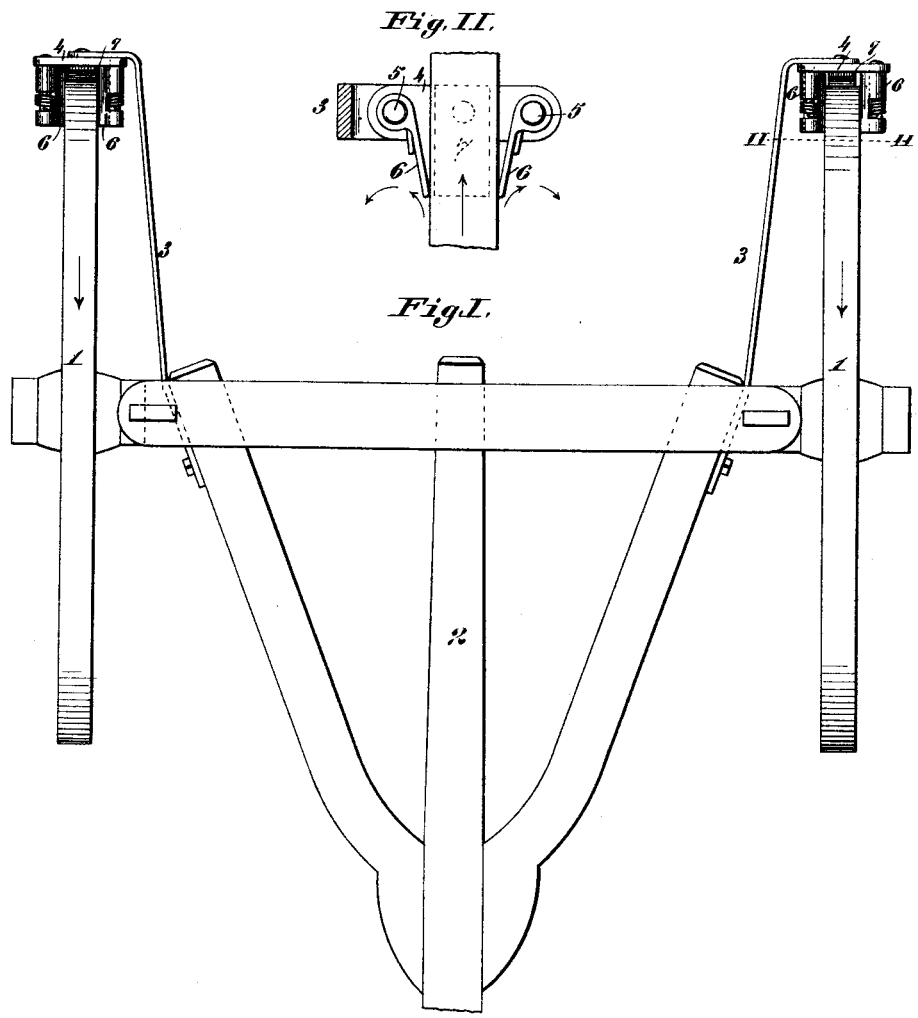
Witnesses:
Charles Pickles,
G. N. Hinchman Jr.
Inventor:
Joseph Sparrow
By his Attorneys,
Fowler & Fowler

UNITED STATES PATENT OFFICE.

JOSEPH SPARROW, OF ATCHISON COUNTY, KANSAS.

VEHICLE-WHEEL SCRAPER.

SPECIFICATION forming part of Letters Patent No. 388,378, dated August 21, 1888.

Application filed April 30, 1888. Serial No. 272,256. (No model.)

*To all whom it may concern:*

Be it known that I, JOSEPH SPARROW, a citizen of the United States, residing in the county of Atchison and State of Kansas, have invented a certain new and useful Device for Removing Mud from Wheels of Vehicles, of which the following is such a full, clear, and exact description as will enable any one skilled in the art to which it appertains to make and use the same, reference being had to the accompanying drawings, forming part of this specification.

The object of my invention is to remove the mud and dirt from wheels as they rotate.

The invention relates to a scraper which embraces the periphery of the wheels, so that when said wheels rotate the mud will be scraped therefrom. The scraper can be attached to any part of the vehicle, but is preferably attached to the tongue or axles. In muddy districts and muddy periods the dirt will adhere to the wheels, and when they rotate will be thrown up against the vehicle, or into the same upon persons therein, covering the vehicle with dirt and soiling the occupants thereof.

My invention is designed to overcome these difficulties. I will now describe it in detail by referring to the accompanying drawings, forming a part hereof, in which—

Figure I is plan of the front wheels and axle of a vehicle with a scraper attached thereto and made in accordance with my invention. Fig. II is a section on the line II II of Fig. I, and Fig. III is an isometric projection of the scraper made in accordance with my invention.

The same figures of reference indicate the same parts throughout the different views.

1 1 are the wheels, which are journaled upon an axle having a tongue, 2, projecting therefrom. To the tongue or axle are secured two arms, 3 3, one on each end thereof. To the free ends of the arms 3 3, which are bent to form substantially a right angle with the main part, is secured a cross-piece, 4, having two lugs, 5 5, projecting therefrom. Upon these lugs are swiveled hinges 6 6, which are held against the wheel by spiral springs that embrace the lugs and bear against the plates 6, the plates 6 being cut away to receive said springs. The plates 6 bear against the face of the fellies. Secured to the cross-piece 4 may also be plate 7, which bears against the tire of the wheel. The scraper may be used without the plate 7, but I have shown it provided with such a plate in order to make it more complete. When the carriage moves forward, the wheels rotate and the mud is scraped from said wheels by the plates.

It will be obvious that the scraper can be carried by any part of the vehicle. The scraper is attached to the vehicle in such a way that it can be readily removed and replaced.

It will be obvious, also, that various changes and modifications can be made in my scraper without departing from the spirit of my invention.

I do not wish, therefore, to limit myself to the exact construction shown, but reserve to myself all changes within the scope of what I desire to claim and secure by Letters Patent of the United States as my invention, which is—

1. The combination, as hereinbefore set forth, to form a scraper for wheels as they rotate, of an arm, 3, secured to the vehicle, a cross-piece, 4, secured to said arm, and spring-actuated plates 6 6, carried by said cross-piece and bearing against the side of the fellies.

2. The combination, as hereinbefore set forth, to form a scraper for wheels as they rotate, of an arm, 3, a cross-piece, 4, secured to said arm and having lugs projecting therefrom, spring-actuated plates 6 6, supported by said lugs, and the plate 7.

In testimony whereof I have hereunto set my hand and affixed my seal, this 25th day of April, 1888, in the presence of two subscribing witnesses.

JOSEPH SPARROW. [L. S.]

Witnesses:
J. F. MARTIN,
WM. H. BLAKER.